United States Patent
Strauss et al.

(10) Patent No.: US 7,753,657 B2
(45) Date of Patent: Jul. 13, 2010

(54) METHOD OF CONTROLLING A PUMPING ASSEMBLY

(75) Inventors: Sebastian Strauss, Virginia Beach, VA (US); Michael French, Pleasant Prairie, WI (US); Evelyn Breznik, Waukegan, IL (US); Jeffrey Gillen, Racine, WI (US); Dave Soderman, Twin Lakes, WI (US)

(73) Assignee: BRP US Inc., Sturtevant, WI (US)

( * ) Notice: Subject to any disclaimer, the term of this patent is extended or adjusted under 35 U.S.C. 154(b) by 1198 days.

(21) Appl. No.: 11/345,358

(22) Filed: Feb. 2, 2006

(65) Prior Publication Data

US 2006/0171816 A1   Aug. 3, 2006

Related U.S. Application Data

(60) Provisional application No. 60/649,708, filed on Feb. 2, 2005.

(51) Int. Cl.
*F04B 43/12* (2006.01)
*F02M 37/04* (2006.01)

(52) U.S. Cl. .......................... 417/53; 417/416; 417/417; 123/497; 123/499; 123/501

(58) Field of Classification Search .................. 417/53, 417/416, 417, 415; 123/179.17, 357, 406.47, 123/496, 497, 498, 499, 500, 501
See application file for complete search history.

(56) References Cited

U.S. PATENT DOCUMENTS 1,908,092 A    5/1933   Whitted
2,934,256 A    4/1960   Lenning
3,386,622 A    6/1968   Cox et al.
3,606,595 A    9/1971   Hideo
3,642,385 A    2/1972   McMahon (Continued)

FOREIGN PATENT DOCUMENTS

DE            3442325            6/1985

(Continued)

OTHER PUBLICATIONS

English Abstract of JP56-159575 (1 page).

(Continued)

*Primary Examiner*—Devon Kramer
*Assistant Examiner*—Leonard J Weinstein
(74) *Attorney, Agent, or Firm*—Osler, Hoskin & Harcourt LLP

(57) ABSTRACT

A method of displacing a pumping assembly. In a first step, a first current is applied in a first direction through a coil assembly to displace a drive assembly from an initial position to cause a first pumping motion. Then, the drive assembly is returned to the initial position to cause a second pumping motion. At some point nearing the end of the second pumping motion, a second current is applied in the first direction through the coil assembly to decelerate the drive assembly before it reaches the initial position. A third current may be applied in a second direction through the coil assembly to cause or assist a return of the drive assembly to the initial position. An apparatus capable of carrying out the method is also disclosed.

9 Claims, 7 Drawing Sheets

U.S. PATENT DOCUMENTS

| | | | |
|---|---|---|---|
| 3,781,140 A * | 12/1973 | Gladden | 417/326 |
| 3,913,536 A | 10/1975 | Läpple et al. | |
| 3,913,546 A | 10/1975 | Clouse | |
| 4,116,591 A | 9/1978 | Mardell | |
| 4,219,863 A | 8/1980 | Takeshima | |
| 4,264,849 A | 4/1981 | Fleischer et al. | |
| 4,266,523 A | 5/1981 | Brinkman | |
| 4,300,873 A | 11/1981 | Mowbray et al. | |
| 4,308,475 A | 12/1981 | Haeck | |
| 4,345,565 A | 8/1982 | Bottoms | |
| 4,351,299 A * | 9/1982 | Costello | 123/472 |
| 4,533,890 A | 8/1985 | Patels | |
| 4,616,930 A | 10/1986 | Martin | |
| 4,682,801 A | 7/1987 | Cook et al. | |
| 4,787,823 A | 11/1988 | Hultman | |
| 4,829,947 A | 5/1989 | Lequesne | |
| 4,841,165 A | 6/1989 | Bowles | |
| 4,884,954 A | 12/1989 | Van Niekerk | |
| 4,940,035 A | 7/1990 | Waring | |
| 5,032,772 A | 7/1991 | Gully et al. | |
| 5,064,353 A | 11/1991 | Tsukahara | |
| 5,080,079 A | 1/1992 | Yoshida et al. | |
| 5,104,229 A | 4/1992 | Paul | |
| 5,104,298 A | 4/1992 | Takahashi et al. | |
| 5,161,779 A | 11/1992 | Graner et al. | |
| 5,267,344 A | 11/1993 | Nelson, III | |
| 5,334,910 A | 8/1994 | Karsten et al. | |
| 5,351,893 A | 10/1994 | Young | |
| 5,434,549 A | 7/1995 | Hirabayashi et al. | |
| 5,469,828 A | 11/1995 | Heimberg et al. | |
| 5,472,323 A | 12/1995 | Hirabayashi et al. | |
| 5,518,372 A | 5/1996 | Chin | |
| 5,520,154 A | 5/1996 | Heimberg et al. | |
| 5,540,206 A | 7/1996 | Heimberg | |
| 5,558,068 A | 9/1996 | Kunishima et al. | |
| 5,602,505 A | 2/1997 | Antone | |
| 5,620,311 A | 4/1997 | Wetzel | |
| 5,630,401 A | 5/1997 | Binversie et al. | |
| 5,779,454 A | 7/1998 | Binversie et al. | |
| 5,895,207 A | 4/1999 | Burgdorf et al. | |
| 5,924,975 A * | 7/1999 | Goldowsky | 600/16 |
| 5,947,702 A | 9/1999 | Biederstadt et al. | |
| 5,960,766 A | 10/1999 | Hellmich | |
| 5,961,045 A | 10/1999 | Coldren et al. | |
| 5,996,548 A | 12/1999 | Hellmich | |
| 6,024,071 A | 2/2000 | Heimberg et al. | |
| 6,036,120 A * | 3/2000 | Varble et al. | 239/585.1 |
| 6,078,118 A | 6/2000 | Reinartz et al. | |
| 6,109,549 A | 8/2000 | Radue et al. | |
| 6,148,800 A | 11/2000 | Cari et al. | |
| 6,161,525 A | 12/2000 | Fitch | |
| 6,179,580 B1 | 1/2001 | Huber et al. | |
| 6,182,350 B1 | 2/2001 | Iwata et al. | |
| 6,188,561 B1 | 2/2001 | Heimberg | |
| 6,196,812 B1 | 3/2001 | Siegel | |
| 6,202,615 B1 | 3/2001 | Pels et al. | |
| 6,247,441 B1 | 6/2001 | Sato et al. | |
| 6,290,308 B1 | 9/2001 | Zitzelsberger | |
| 6,398,511 B1 * | 6/2002 | French et al. | 417/53 |
| 6,401,696 B1 | 6/2002 | Heimberg | |
| 6,422,836 B1 * | 7/2002 | Krueger et al. | 417/418 |
| 6,584,958 B2 * | 7/2003 | Rahardja et al. | 123/467 |
| 6,607,361 B1 | 8/2003 | Kotter et al. | |
| 6,663,348 B2 * | 12/2003 | Schwarz et al. | 417/12 |
| 6,799,559 B2 * | 10/2004 | Mieny et al. | 123/490 |
| 6,857,857 B2 * | 2/2005 | Dovey et al. | 417/44.1 |
| 6,964,263 B2 * | 11/2005 | Xi et al. | 123/499 |
| 6,966,760 B1 | 11/2005 | Radue | |
| 7,021,568 B2 * | 4/2006 | Rieger et al. | 239/585.1 |
| 7,227,439 B2 * | 6/2007 | Kelly | 335/229 |
| 7,267,533 B1 * | 9/2007 | Tocci et al. | 417/552 |

FOREIGN PATENT DOCUMENTS

| | | |
|---|---|---|
| DE | 199224485 | 12/1999 |
| GB | 1504873 | 3/1978 |
| GB | 2306580 | 7/1997 |
| JP | 56-159575 | 12/1981 |
| JP | 56-159576 | 12/1981 |
| JP | 61-200386 | 9/1986 |
| JP | 06-38486 | 2/1994 |
| JP | 06-185456 | 7/1994 |
| JP | 06-200869 | 7/1994 |
| JP | 06-346833 | 12/1994 |
| JP | 07-27041 | 1/1995 |
| JP | 07-109975 | 4/1995 |
| JP | 07-259729 | 10/1995 |
| JP | 08-116658 | 5/1996 |
| JP | 2000-170646 | 6/2000 |
| RU | 812953 A2 | 3/1981 |
| RU | 971116 A3 | 10/1982 |
| RU | 1064026 A1 | 12/1983 |
| WO | WO 03048573 A1 * | 6/2003 |

OTHER PUBLICATIONS

English Abstract of JP06-200869 (1 page).
English Abstract of JP06-38486 (1 page).
English Abstract of JP-200-299971 (1 page).
English Abstract of JP07-27041 (1 page).
English Abstract of DE-19924485 (1 page).
English Translation of DE-3442325 (7 pages).
English Abstract of JP-07109975 (1 page).
English Abstract of JP-2000-170646 (1 page).
English Abstract of JP-08-116658 (1 page).
English Abstract of JP-07-259729 (1 page).
English Abstract of JP-06-185456 (1 page).
English Abstract of JP-06-346833 (1 page).
English Abstract of JP-56-159576 (1 page).
English abstract of Russian Patent SU1064026.

* cited by examiner

This application claims priority from U.S. Provisional Application No. 60/649,708 filed Feb. 2, 2005, which is incorporated herein by reference. This application is also related to U.S. patent application Ser. No. 09/641,325, now U.S. Pat. No. 6,398,511, filed on Aug. 18, 2000; U.S. patent application Ser. No. 10/153,370, filed on May 21, 2002; U.S. patent application Ser. No. 10/675,609, filed on Sep. 30, 2003; U.S. patent application Ser. No. 09/528,766, now U.S. Pat. No. 6,966,760, filed on Mar. 17, 2000; U.S. patent application Ser. No. 11/196,379, filed on Aug. 4, 2005; and International Application PCT/US01/47300, filed on Dec. 3, 2001; all of which are incorporated herein by reference.

METHOD OF CONTROLLING A PUMPING ASSEMBLY

BACKGROUND OF THE INVENTION

1. Field of the Invention

The present invention relates generally to an apparatus for pumping fluids and method for controlling the apparatus.

2. Description of the Related Art

A wide range of pumps have been developed for displacing fluids under pressure produced by electrical drives. For example, in certain fuel injection systems, fuel is displaced via a reciprocating pump assembly which is driven by electric current supplied from a source, typically a vehicle electrical system. In one fuel pump design of this type, a reluctance gap coil is positioned in a solenoid housing, and an armature is mounted movably within the housing and secured to a guide tube. The solenoid coil may be energized to force displacement of the armature toward the reluctance gap in a magnetic circuit defined around the solenoid coil. The guide tube moves with the armature, entering and withdrawing from a pump section. By reciprocal movement of the guide tube into and out of the pump section, fluid is drawn into the pump section and expressed from the pump section during operation.

In pumps of the type described above, the armature and guide tube are typically returned to their initial position under the influence of one or more biasing springs. Where a fuel injection nozzle is connected to the pump, an additional biasing spring may be used to return the injection nozzle to its initial position. Upon interruption of energizing current to the coil, the combination of biasing springs then forces the entire drive assembly to its initial position. The cycle time of the resulting device is the sum of the time required for the pressurization stroke during energization of the solenoid coil, when the drive assembly moves to an actuated position, and the time required for returning the armature and guide to the initial position for the next pressurization stroke. Engine speed is generally a function of the flow rate of fuel to the combustion chamber. Increasing the speed of the engine shortens the duration of each combustion cycle. Thus, a fuel delivery system must provide the desired volumes of fuel for each combustion cycle at increasingly faster rates if the engine speed is to be increased.

Where such pumps are employed in demanding applications, such as for supplying fuel to combustion chambers of an internal combustion engine, cycle times can be extremely rapid. Cycle time refers to the amount of time required for a fuel injector to load with fuel, discharge the fuel into the combustion chamber and then return to its initial position to start the cycle over again. Cycle time is typically short for fuel injectors. For example, injectors used in a direct injection system can obtain a cycle time of 0.01 seconds. That equates to the injectors being able to load with fuel, discharge the fuel into the combustion chamber, and then prepare to reload for a subsequent cycle 100 times in a single second. While this cycle time seems very short, it is often desirable to reduce this time even further when possible.

Moreover, repeatability and precision in beginning and ending of pump stroke cycles can be important in optimizing the performance of the engine under varying operating conditions. While the cycle time may be reduced by providing stronger springs for returning the reciprocating drive assembly to the initial position, such springs have the adverse effect of opposing forces exerted on the reciprocating drive assembly by energization of the solenoid. Such forces must therefore be overcome by correspondingly increased forces created during energization of the solenoid. At some point, however, increased current levels required for such forces become undesirable due to the limits of the electrical components, and additional heating produced by electrical losses.

In high performance engines, such as those used in motorcycles and snowmobiles, the engine speed can reach very high levels, which means very short cycle times. To achieve this, the armature and guide tube need to be returned to their initial position very quickly. This means that the armature and guide tube are returned to their initial position at a relatively high velocity. When the armature impacts the housing at a high velocity, the force of the impact will cause the armature to bounce around, meaning that the force of the impact will cause it to move away from the housing before being pushed back towards the initial position by the biasing force of the spring. This may result in the armature not being in the correct initial position upon the initiation of the following injection event, thus reducing the precision of the injector.

On a different note, the level of noise generated by engines has been lowered considerably over recent years. This causes noises that were not previously audible, especially at low engine speeds, to now be heard. One such noise is the "clicking" sound generated by the injector when the armature impacts the housing upon returning to its initial position. This "clicking" sound can be a disagreement to a person using the engine. That situation would also be problematic in applications where a linearly reciprocating fluid pump is used in other devices generating relatively low noise.

In view of the above-mentioned problems, there is a need not only to control the beginning of the pump stroke cycle but also the ending of the pump stroke cycle in an attempt to ameliorate one or more of the previously mentioned problems.

There is thus a need for an improved technique for pumping fluids in a linearly reciprocating fluid pump. There is a particular need for an improved technique for providing rapid cycle times in fluid pumps while maintaining, and even increasing, the precision of the fluid pump.

There is also a need for a method of reducing the noise generated by a linearly reciprocating fluid pump.

SUMMARY OF THE INVENTION

The present invention provides a novel technique for pumping fluids in a reciprocating pump arrangement designed to respond to at least one, and preferably all, these needs. The technique is particularly well suited for use in fuel delivery systems, such as in chamber fuel injection. The pumping drive system offers significant advantages over known arrangements, including a reduction in cycle times and so forth.

The technique is based upon a pumping assembly employing at least one permanent magnet and at least one coil assembly, one of which forms at least in part a drive assembly. The coil assembly is energized cyclically by a reciprocating circuit to produce reciprocating motion of a drive assembly, which may be coupled directly to the coil. The drive assembly may extend into a pumping section, and cause variations in fluid pressure by intrusion into and withdrawal from the pumping section during its reciprocal movement. Valves, such as check valves, within the pumping section are actuated by the variations in pressure, permitting fluid to be drawn into the pumping section and expressed therefrom.

More specifically, the drive assembly has a reciprocating coil assembly to which alternating polarity control signals are applied by a reciprocating circuit. A permanent magnet structure of the drive section creates a magnetic flux field which interacts with an electromagnetic field produced during application of the control signals to the coil. Depending upon the polarity of the control signals applied to the coil, a force is applied to the coil in one of two directions. The reciprocating circuit employs a storage capacitor and several switches to capture the energy of the reciprocating coil as the drive assembly is driven downwardly. The charge is recycled as the capacitor dissipates, thereby reversing the polarity of the current through the coil and driving the drive assembly upwardly to its initial position. A drive member transfers movement of the coil to a pump element which reciprocates with the coil to draw fluid into a pump chamber and expel the fluid during each pump cycle.

One aspect of embodiments of this invention provides a method of displacing a pumping assembly which reduces the "clicking" noise generated by a linearly reciprocating fluid pump.

Another aspect of embodiments of this invention provides a method of displacing a pumping assembly which reduces the impact velocity between a drive assembly and a housing of a linearly reciprocating fluid pump, thereby improving the precision of the pump when operating in short cycle times.

A further aspect of embodiments of this invention provides a method of operating a fuel injector for an internal engine over a range of engine speeds.

It should be noted that some embodiments of the present invention may cover more than one aspect of this invention.

The invention is directed to a method of displacing a pumping assembly such as the one described herein above. In a first step, a first current is applied in a first direction through a coil assembly to displace a drive assembly from an initial position to cause a first pumping motion. Then, the drive assembly is returned to the initial position to cause a second pumping motion. At some point nearing the end of the second pumping motion, a second current is applied in the first direction through the coil assembly to decelerate the drive assembly before it reaches the initial position.

It is contemplated that a third current may be applied in a second direction through the coil assembly to cause or assist a return of the drive assembly to the initial position.

The invention is also directed to a method of controlling a fuel injector for an internal combustion engine. The method consists of providing an injection controller which controls the fuel injector by applying energizing signals to a drive assembly. A combination of energizing signals is known as a waveform. The injection controller applies a waveform which is most appropriate to the operating conditions of the engine and may apply a different waveform should the operating condition of the engine change.

More specifically, in a first step, an injection controller is provided which applies signal waveforms to a drive assembly of the fuel injector to control the movement of the drive assembly. The signal waveforms are made up of at least one of a first, a second, and a third energizing signal. The first energizing signal displaces the drive assembly from an initial position to cause a first pumping motion. The second energizing signal returns the drive assembly to the initial position to cause a second pumping motion. The third energizing signal decelerates the pumping assembly before it reaches the initial position. A first signal waveform made up of the first and third energizing signals is applied to the drive assembly over a first range of engine speeds. A second signal waveform made up of at least the first and second energizing signals is applied to the drive assembly over a second range of engine speeds greater than the first range.

It is contemplated that the second signal waveform may also include the third energizing signal.

It is also contemplated that a third signal waveform made up of the first, second, and third signals may be applied to the drive assembly over a third range of engine speeds greater than the second range.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
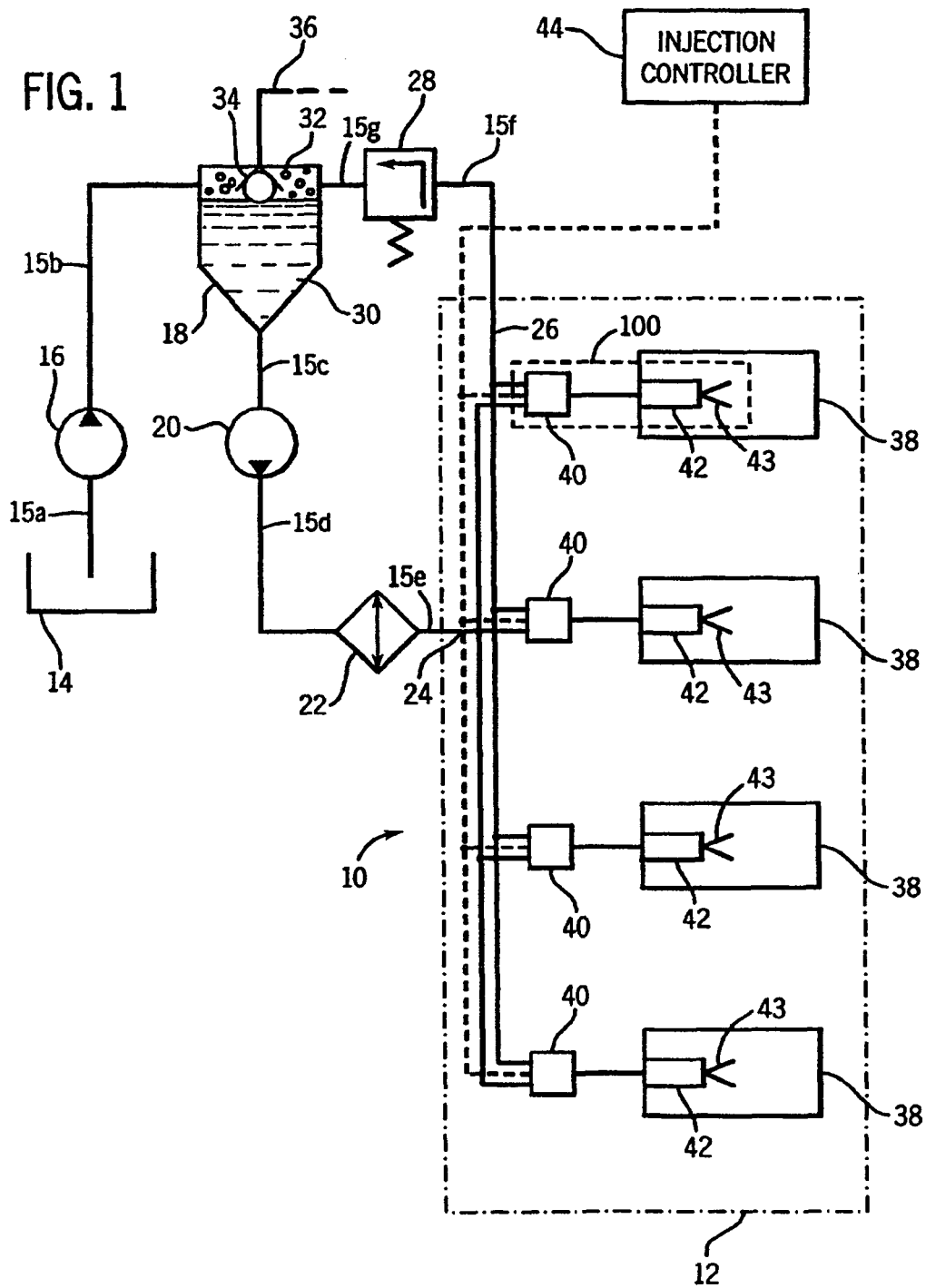
FIG. 1 is a diagrammatical representation of a series of fluid pump assemblies applied to inject fuel into an internal combustion engine.

Turning now to the drawings and referring first to FIG. 1, a fuel injection system 10 is illustrated diagrammatically, including a series of pumps for displacing fuel under pressure in an internal combustion engine 12. While the fluid pumps of the present technique may be employed in a wide variety of settings, they are particularly well suited to fuel injection systems in which relatively small quantities of fuel are pressurized cyclically to inject the fuel into combustion chambers of an engine as a function of the engine demands. The pumps may be employed with individual combustion chambers as in the illustrated embodiment, or may be associated in various ways to pressurize quantities of fuel, as in a fuel rail, feed manifold, and so forth. Even more generally, the present pumping technique may be employed in settings other than fuel injection (e.g. water injection in exhaust system, lubricant injection), such as for displacing fluids under pressure in response to electrical control signals used to energize coils of a drive assembly, as described below.

In the embodiment shown in FIG. 1, the fuel injection system 10 includes a fuel reservoir 14, such as a tank for containing a reserve of liquid fuel. A first pump 16 draws the fuel from the reservoir through a first fuel line 15a, and delivers the fuel through a second fuel line 15b to a separator 18. While the system may function adequately without a separator 18, in the illustrated embodiment, separator 18 serves to ensure that the fuel injection system downstream receives liquid fuel, as opposed to mixed phase fuel. A second pump 20 draws the liquid fuel from separator 18 through a third fuel line 15c and delivers the fuel, through a fourth fuel line 15d and further through a cooler 22, to a feed or inlet manifold 24 through a fifth fuel line 15e. Cooler 22 may be any suitable type of fluid cooler, including both air and liquid heater exchangers, radiators, and the like.

Fuel from the feed manifold 24 is available for injection into combustion chambers of engine 12, as described more fully below. A return manifold 26 is provided for recirculating fluid not injected into the combustion chambers of the engine. In the illustrated embodiment a pressure regulating valve 28 is coupled to the return manifold line 26 through a sixth fuel line 15f and is used for maintaining a desired pressure within the return manifold 26. Fluid returned via the pressure regulating valve 28 is recirculated into the separator 18 through a seventh fuel line 15g where the fuel collects in liquid phase as illustrated at reference numeral 30. Gaseous phase components of the fuel, designated by referenced numeral 32 in FIG. 1, may rise from the fuel surface and, depending upon the level of liquid fuel within the separator, may be allowed to escape via a float valve 34. The float valve 34 consists of a float that operates a ventilation valve coupled to a ventilation line 36. The ventilation line 36 is provided for permitting the escape of gaseous components, such as for repressurization, recirculation, and so forth. The float rides on the liquid fuel 30 in the separator 18 and regulates the ventilation valve based on the level of the liquid fuel 30 and the presence of vapor in the separator 18.

Engine 12 includes a series of cylinders or combustion chambers 38 for driving an output shaft (not shown) in rotation. As will be appreciated by those skilled in the art, depending upon the engine design, pistons (not shown) are driven in a reciprocating fashion within each combustion chamber in response to ignition of fuel within the combustion chamber. The stroke of the piston within the chamber will permit fresh air for subsequent combustion cycles to be admitted into the chamber, while scavenging combustion products from the chamber. While the present embodiment employs a straightforward two-stroke engine design, the pumps in accordance with the present technique may be adapted for a wide variety of applications and engine designs, including other than two-stroke engines and cycles.

In the illustrated embodiment, a reciprocating pump 40, in this case a fuel injector, is associated with each combustion chamber 38, drawing pressurized fuel from the feed manifold 24, and further pressurizing the fuel for injection into the respective combustion chamber 38. A nozzle 42 is provided for atomizing the pressurized fuel downstream of each reciprocating pump 40. While the present technique is not intended to be limited to any particular injection system or injection scheme, in the illustrated embodiment, a pressure pulse created in the liquid fuel forces a fuel spray 43 to be formed at the mouth or outlet of the nozzle 42, for direct, in-cylinder injection. The operation of reciprocating pumps 40 is controlled by an injection controller 44. Injection controller 44, which will typically include a programmed microprocessor or other digital processing circuitry and memory for storing a routine employed in providing control signals to the pumps, applies energizing signals to the pumps to cause their reciprocation in any one of a wide variety of manners as described more fully below.

Figure 2:
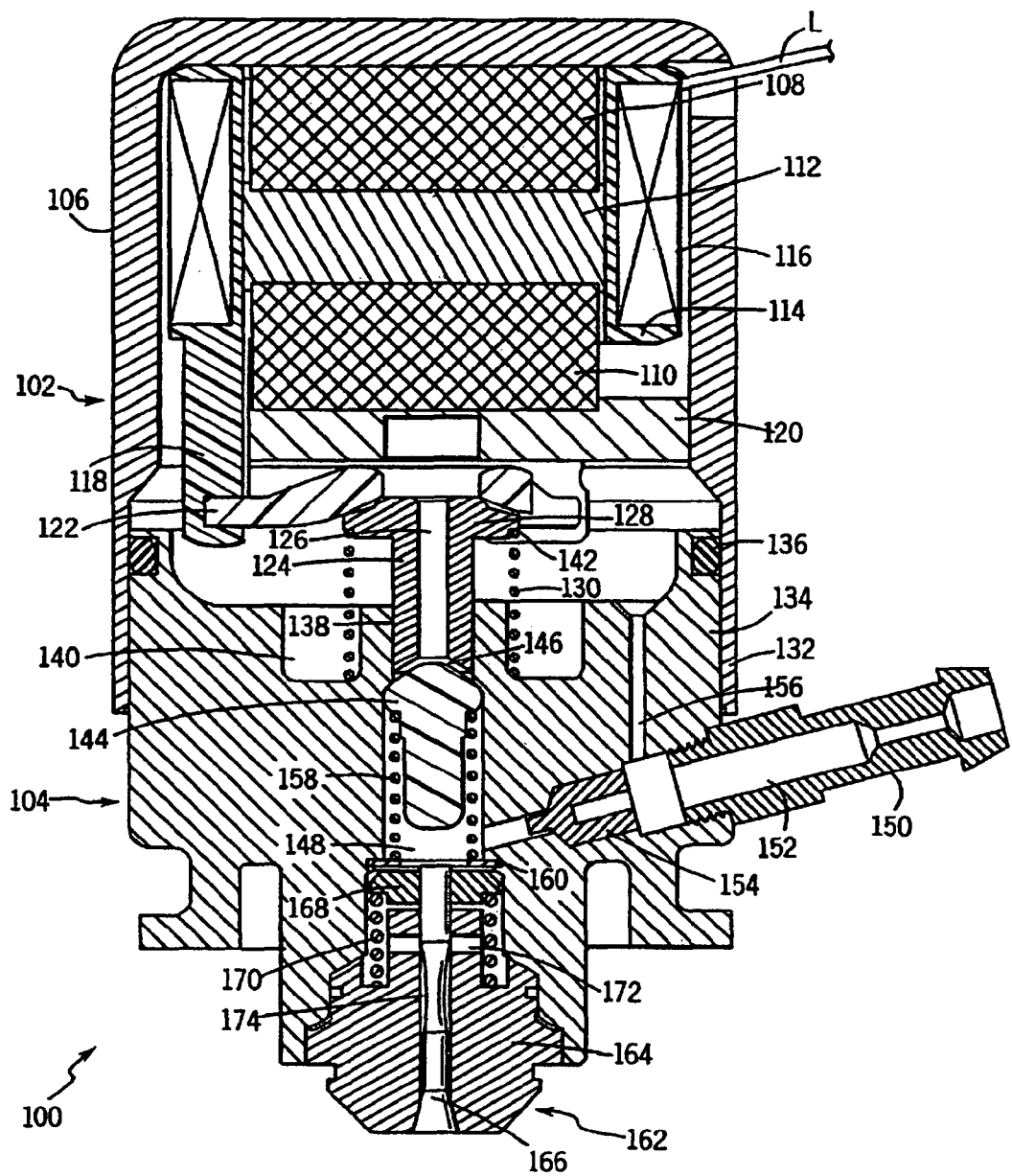
FIG. 2 is a partial sectional view of an exemplary pump in accordance with aspects of the present technique for use in displacing fluid under pressure, such as for fuel injection into a chamber of an internal combustion engine as shown in FIG. 1.
Figure 3:
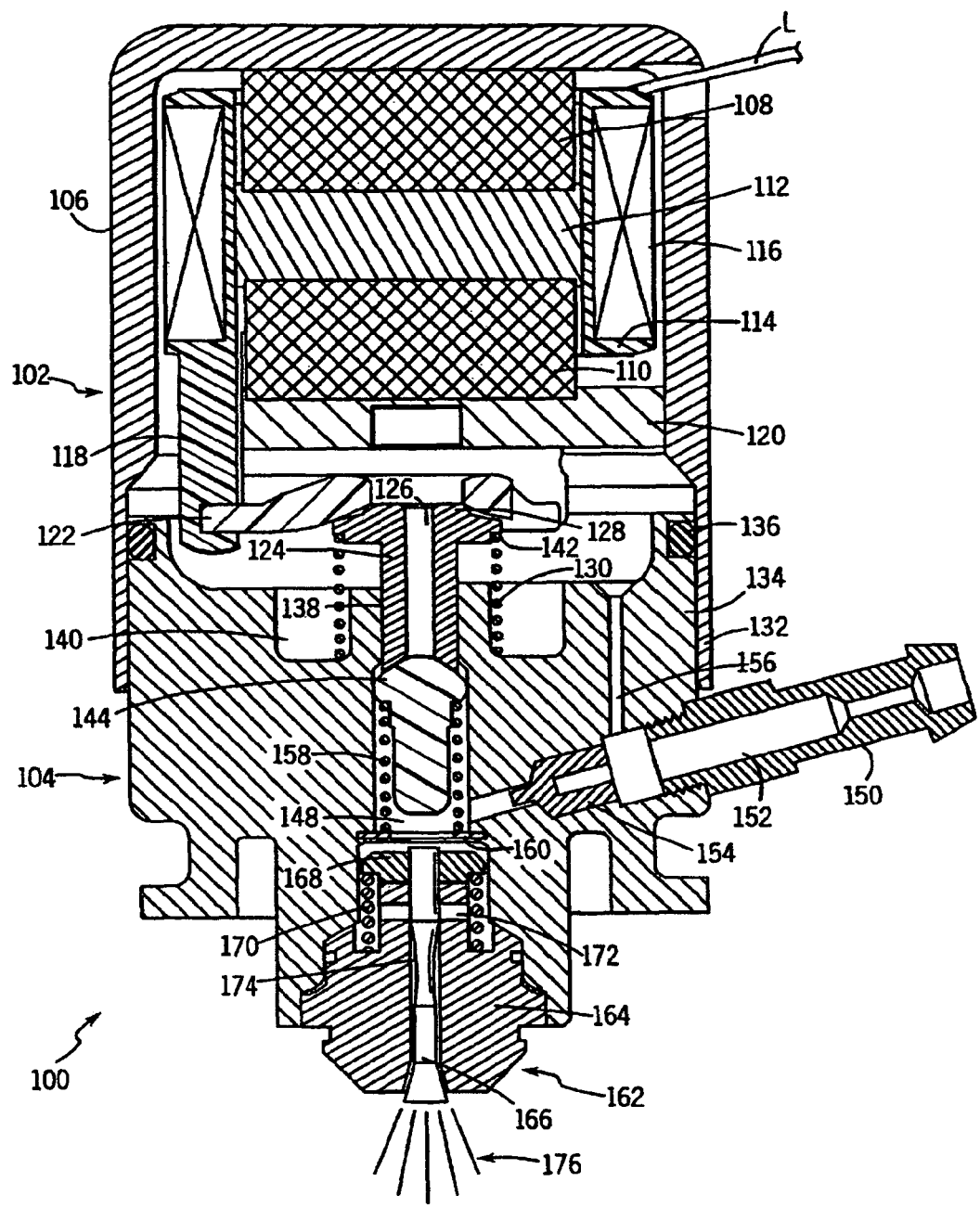
FIG. 3 is a partial sectional view of the pump illustrated in FIG. 2 energized during a pumping phase of operation.

An exemplary reciprocating pump assembly, such as for use in a fuel injection system of the type illustrated in FIG. 1, is shown in FIGS. 2 and 3. Specifically, FIG. 2 illustrates a pump and nozzle assembly 100 which incorporates a pump driven in accordance with the present techniques. Assembly 100 essentially comprises a drive section 102 and a pump section 104. The drive section 102 is designed to cause reciprocating pumping action within the pump section 104 in response to application of reversed polarity control signals applied to an actuating coil of the drive section as described in greater detail below. The characteristics of the output of the pump section 104 may thus be manipulated by altering the waveform of the alternated polarity signal applied to the drive section 102. In the presently contemplated embodiment, the pump and nozzle assembly 100 illustrated in FIG. 2 is particularly well suited for application in an internal combustion engine, as illustrated in FIG. 1. Moreover, in the embodiment illustrated in FIG. 2, a nozzle assembly is installed directly at an outlet of the pump section 104, such that the pump 40 and the nozzle 42 of FIG. 1 are incorporated into a single assembly 100. As indicated above, in appropriate applications, the pump 40 may be separated from the nozzle 42, such as for application of fluid under pressure to a manifold, fuel rail, or other downstream component.

As illustrated in FIG. 2, drive section 102 includes a housing 106 designed to receive and support the drive section 102 during operation as well as to seal the components within the housing 106. The drive section 102 further includes at least one permanent magnet 108, and in the preferred embodiment illustrated, a pair of permanent magnets 108 and 110. The permanent magnets 108 and 110 are separated from one another and disposed adjacent to a central core 112 made of a material which is capable of conducting magnetic flux, such as a ferromagnetic material. A coil bobbin 114 is disposed about permanent magnets 108 and 110 and core 112. While magnets 108 and 110, and core 112 are fixedly supported within housing 106, bobbin 114 is free to slide longitudinally with respect to these components. That is, bobbin 114 is centered around core 112, and may slide with respect to the core upwardly and downwardly in the orientation shown in FIG. 2. A coil 116 is wound within bobbin 114 and free ends of the coil are coupled to leads L for receiving energizing control signals, such as from an injection controller 44, as illustrated in FIG. 1 and discussed further with reference to FIG. 4. Bobbin 114 further includes an extension 118 which protrudes from the region of the bobbin 114 in which the coil 116 is installed for driving the pump section 104, as described below. Although one such extension is illustrated in FIG. 2, it should be understood that the bobbin 114 may comprise a series of extensions arranged circumferentially around the bobbin 114. Finally, drive section 102 includes a support or partition 120 which aids in supporting the permanent magnets 108 and 110 and the central core 112, and in separating the drive section 102 from the pump section 104. It should be noted, however, that in the illustrated embodiment, the inner volume of the drive section 102, including the volume in which the coil 116 is disposed, may be flooded with fluid during operation, such as for cooling purposes.

A drive member 122 is secured to bobbin 114 via extension 118. In the illustrated embodiment, drive member 122 forms a generally cup-shaped plate having a central aperture for the passage of fluid. The cup shape of the drive member 122 aids in centering a plunger 124 which is disposed within a concave portion of the drive member 122. Plunger 124 preferably has a longitudinal central opening or aperture 126 extending from its base to a head region 128 designed to contact and bear against drive member 122. A biasing spring 130 is compressed between the head region 128 and a lower component of the pump section 104 to maintain the plunger 124, the drive member 122, and bobbin 114 and coil 116 in an initial position. As will be appreciated by those skilled in the art, plunger 124, drive member 122, extension 118, bobbin 114, and coil 116 thus form a reciprocating drive assembly which is driven in an oscillating motion during operation of the device as described more fully below. It should be understood that other types and configurations of drive assembly could be used in the present invention.

The drive section 102 and pump section 104 are designed to interface with one another, preferably to permit separate manufacturing and installation of these components as subassemblies and to permit their servicing, as needed. In the illustrated embodiment, housing 106 of drive section 102 terminates in a skirt 132 which is secured about a peripheral wall 134 of pump section 104. The drive and pump sections 102 and 104 are preferably sealed, such as via a soft seal 136. Alternatively, these housings maybe interfaced via threaded engagement, or any other suitable technique.

Pump section 104 forms a central aperture 138 designed to receive plunger 124. Aperture 138 also serves to guide the plunger in its reciprocating motion during operation of the device. An annular recess 140 surrounds aperture 138 and receives biasing spring 130, maintaining the biasing spring 130 in a centralized position to further aid in guiding plunger 124. In the illustrated embodiment, head region 128 includes a peripheral groove or recess 142 which receives biasing spring 130 at an end opposite recess 140.

A valve member 144 is positioned in pump section 104 below plunger 124. In the illustrated embodiment, valve member 144 forms a separable extension of plunger 124 during operation, but is spaced from plunger 124 by a gap 146 when plunger 124 is retracted as illustrated in FIG. 2. Gap 146 is formed by limiting the upward movement of valve member 144, such as by a restriction in the peripheral wall defining aperture 138. Grooves (not shown) may be provided at this location to allow for the flow of fluid around valve member 144 when the plunger is advanced to its retracted position. As described more fully below, gap 146 permits the entire reciprocating drive assembly, including plunger 124, to gain momentum during a pressurization stroke before contacting valve member 144 to compress and expel fluid from the pump section.

Valve member 144 is positioned within a pump chamber 148. Pump chamber 148 receives fluid from an inlet 150. Inlet 150 thus includes inlet passage 152 through which fluid, such as pressurized fuel, is introduced into the pump chamber 148. A check valve assembly, indicated generally at reference numeral 154, is provided between inlet passage 152 and pump chamber 148, and is closed by the pressure created within pump chamber 148 during a pressurization stroke of the device. In the illustrated embodiment, a fluid passage 156 is provided between inlet passage 152 and the volume within which the drive section 102 components are disposed. Fluid passage 156 may permit the free flow of fluid into the drive section 102, to maintain that the drive section components bathed in fluid. A fluid outlet (not shown) may similarly be in fluid communication with the internal volume of the drive section 102, to permit the recirculation of fluid from the drive section 102. Valve member 144 is maintained in a biased position toward gap 146 by a biasing spring 158. In the illustrated embodiment, biasing spring 158 is compressed between an upper portion of the valve member 144 and a retaining ring 160.

When the pump defined by the components described above is employed for direct fuel injection, as one exemplary utilization, a nozzle assembly 162 may be incorporated directly into a lower portion of the pump assembly 104. As shown in FIG. 2, an exemplary nozzle assembly 162 includes a nozzle body 164 which is sealingly fitted to the pump section 104. A poppet 166 is positioned within a central aperture formed in the valve body, and is sealed against the valve body in a retracted position. At an upper end of poppet 166, a retaining member 168 is provided. Retaining member 168 contacts a biasing spring 170 which is compressed between the nozzle body 164 and the retaining member 168 to maintain the poppet 166 in a biased, sealed position within the nozzle body 164. Fluid is free to pass from pump chamber 148 into the region surrounding the retaining member 168 and spring 170. This fluid is further permitted to enter into passages 172 formed in the nozzle body 164 around poppet 166. An elongated annular flow path 174 extends from passages 172 to the sealed end of the poppet 166. As will be appreciated by those skilled in the art, other components may be incorporated into the drive section 102, the pump section 104, or the nozzle assembly 162. For example, where desired, an outlet check valve may be positioned at the exit of pump chamber 148 to isolate a downstream region from the pump chamber.

FIG. 3 illustrates the pump and nozzle assembly of FIG. 2 in an actuated position. As shown in FIG. 3, upon application of energizing current in a first direction to the coil 116, the coil 116, bobbin 114, extension 118, and drive member 122 are displaced downwardly. This downward displacement is the result of interaction between the electromagnetic field surrounding coil 116 by application of the energizing current thereto, and the magnetic field present by virtue of permanent magnets 108 and 110. In the preferred embodiment, this magnetic field is reinforced and channeled by core 112. As drive member 122 is forced downwardly by interaction of these fields, it contacts plunger 124 to force the plunger downwardly against the resistance of spring 130. During an initial phase of this displacement, plunger 142 is free to extend into pump chamber 148 without contact with valve member 144, by virtue of gap 146 (see FIG. 2). Plunger 142 thus gains momentum, and eventually contacts the upper surface of valve member 144. The lower surface of plunger 124 seats against and seals with the upper surface of valve member 144, to prevent flow of fluid upwardly through passage 126 of the plunger 142, or between the plunger 142 and the aperture 138 of the pump section 104. Further downward movement of the plunger 142 and valve member 144 begin to compress fluid within pump chamber 148, closing inlet check valve 154.

Still further movement of the plunger 142 and the valve member 144 produces a pressure surge or spike which is transmitted downstream, such as to nozzle assembly 162. In the illustrated embodiment, this pressure surge forces poppet 166 to unseat from the nozzle body 164, moving downwardly with respect to the nozzle body 164 by a compression of spring 170 between retainer 168 and the nozzle body 164. Fluid 176, such as fuel, is thus sprayed or released from the nozzle 162, such as directly into a combustion chamber of an internal combustion engine as described above with reference to FIG. 1.

As will be appreciated by those skilled in the art, upon reversal of the polarity of the drive or control signal applied to coil 116, thus applying the signal is a second direction through the leads L, an electromagnetic field surrounding the coil 116 will reverse in orientation, causing an oppositely oriented force to be exerted on the coil 116 by virtue of interaction between this field and the magnetic field produced by magnets 108 and 110. This force will thus drive the coil 116, and other components of the reciprocating drive assembly back toward their initial position (shown in FIG. 2). In the illustrated embodiment, as drive member 122 is driven upwardly back towards the initial position illustrated in FIG. 2, spring 130 urges plunger 128 upwardly towards its initial position, and spring 158 similarly urges valve member 144 back towards its initial position. Gap 126 is reestablished as illustrated in FIG. 2, and a new pumping cycle may begin. Where a nozzle 162 such as that shown in FIGS. 2 and 3 is provided, the nozzle 162 is similarly closed by the force of spring 170. In this case, as well as where no such nozzle is provided, or where an outlet check valve is provided at the exit of pump chamber 148, pressure is reduced within pump chamber 148 to permit inlet check valve 154 to reopen for introduction of fluid for a subsequent pumping cycle.

Under certain conditions, a signal will be applied to coil 116 to decelerate the drive assembly as it moves back towards its initial position. This signal has the same polarity, and therefore runs in the same direction through the coil 116, as the signal being applied to move the drive assembly towards its actuated position. By applying this signal in the relative instant prior to the drive assembly reaching its initial position, it is possible to slow down the drive assembly in order to reduce or eliminate the "clicking" noise at low speeds or prevent the drive assembly from bouncing around at high speed since the force of the impact is reduced, as will be described in greater details below.

Figure 4:
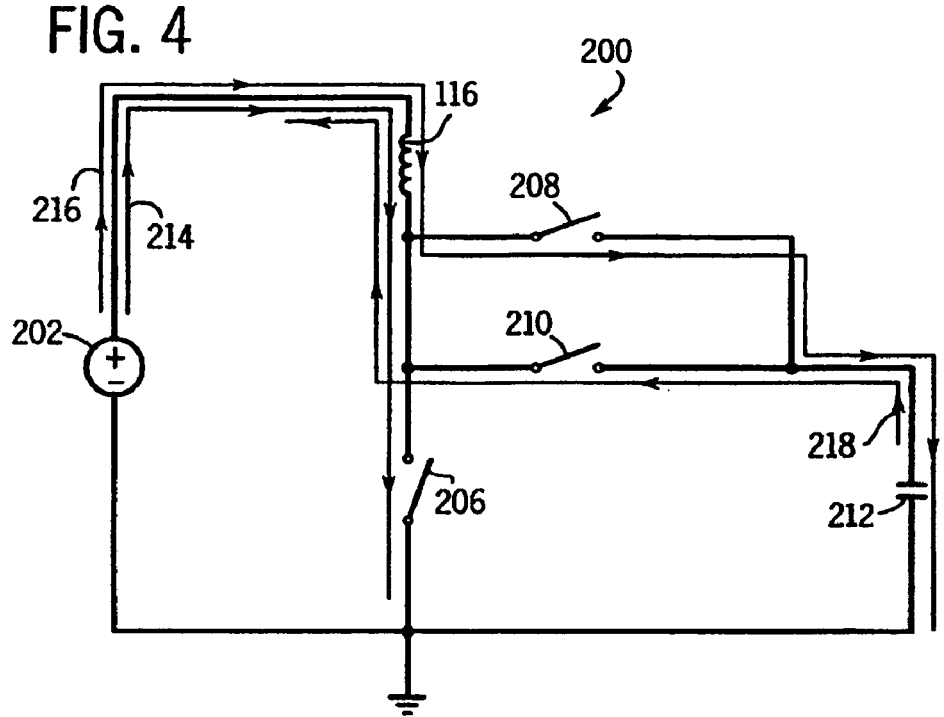
FIG. 4 is a circuit diagram illustrating a reciprocating circuit and current flow in accordance with the present invention.

By appropriately configuring drive signals applied to coil 116 through the leads L, the device of the present invention may be driven in a wide variety of manners. FIG. 4 shows a basic circuit in accordance with the present invention. The circuit 200 provides a means for driving the electromechanical solenoid, used here in a fuel injector, which provides for an accelerated reciprocal motion of the drive assembly illustrated in FIGS. 2 and 3. The voltage source 202 is used to provide the current flow to the coil 116 through leads L illustrated in FIGS. 2 and 3. Also coupled to the coil 116 is a series of switches 206, 208, and 210. The switches 206, 208, and 210 are arranged to allow a capacitor 212 to store voltage to provide a reverse current through the circuit which will facilitate a faster reciprocal motion of the drive assembly (shown in FIGS. 2 and 3), as discussed below. Initially, the first switch 206 is closed and the second and third switches 208 and 210 are open. When voltage is applied by the source 202, a current flows in the path indicated by current path 214. Because the first switch 206 is closed, it provides a path to ground and thus the current 214 will flow from the voltage source 202 through the coil 116 through the closed switch 206 and to ground. This actuates the coil 116, converting the electrical energy produced by the voltage source 202 into a linear motion of the drive assembly which operates the fuel injection system, as described with reference to FIGS. 2 and 3.

Next, the first switch 206 is opened, thereby producing a voltage across the coil 116. At this time, the second switch 208 is closed. The current flows from the voltage source 202 as indicated by current path 216. The current 216 flows from the voltage source 202 through the coil 116, through the second switch 208 and through the capacitor 212. At this time, the voltage which was stored in the coil 116 will be transferred and stored in the capacitor 212. Depending on the energy stored in the coil 116 at the time the second switch 208 is closed, and depending upon size of the capacitor 212, the voltage magnitude in the capacitor 212 will vary. Once the voltage of the capacitor 212 reaches a predetermined voltage, the second switch 208 is opened and the third switch 210 is closed. This situation will be triggered when the voltage stored in the capacitor 212 becomes higher than the voltage produced by the source 202. The current now flows through the circuit as indicated by flow path 218. The current 218 flows from the capacitor 212 through the third switch 210 and back through the coil 116. This reverse current will push the drive assembly back to its initial position as indicated in FIG. 2.

Next, before the drive assembly reaches its initial position, the third switch 210 is opened, the first switch 206 is closed and a voltage is applied by the voltage source 202. The current once again flows in the path indicated by current path 214. This will create a force which will slow down the drive assembly before it reaches its initial position. Finally, the first switch 206 is opened and the second switch 208 is closed such that the voltage stored in the coil 116 will be transferred to the capacitor 212 in the manner previously described.

By using a reverse current 218 to provide reciprocal motion of the drive assembly in accordance with the embodiment described herein, several advantages over prior electromechanical solenoid based systems, such as fuel injectors, may be achieved. First, as previously discussed and as will be discussed with reference to FIG. 6, the cycle time for fuel injection may be reduced. Second, because the system is recycling the energy by storing energy from the coil 116 in a capacitor 212 and then recycling that energy to produce the reciprocal motion of the drive assembly, the power consumption of the injection system may be reduced. Third, there is a reduction in the power dissipation in the first switch 206.

By applying a current through path 214 to slow down the drive assembly before it reaches its initial position, and thus the force of the impact between the drive assembly and the housing is reduced. At low speeds, this can reduce the "clicking" noise. At high speeds, this can prevent the drive assembly from bouncing around, thus improving the precision of the subsequent pumping cycle.

Figure 5:
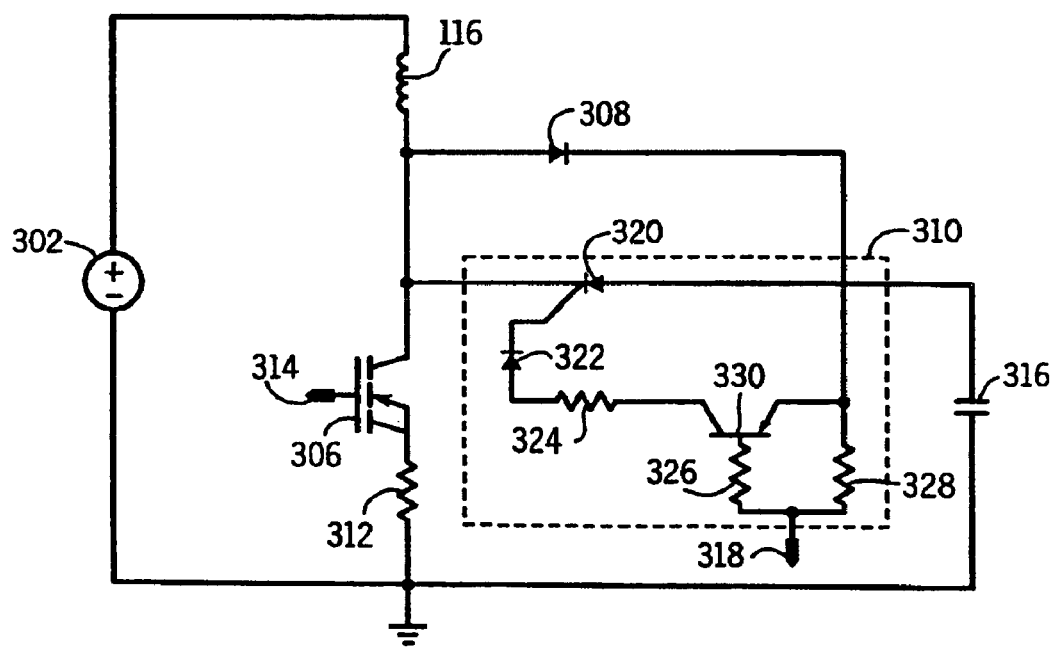
FIG. 5 is an exemplary embodiment of the reciprocating circuit illustrated in FIG. 4.

FIG. 5 illustrates one specific embodiment of a circuit incorporating the present technique. It should be noted however that any suitable substitute for the particular elements shown in FIG. 5 may be used. FIG. 5 illustrates a voltage source 302 which may be a 55 volt source. The voltage source 302 is coupled to one lead of the coil 116. The second lead of the coil 116 is coupled to the switches 306, 308, and 310. The first switch in the embodiment illustrated in FIG. 5 is an n-channel MOSFET 306. The drain of the MOSFET 306 is coupled to the second lead of the coil 116. The source of the MOSFET 306 is coupled to ground through a resistor 312. The gate of the MOSFET 306 is coupled to a micro-controller 314 as discussed in FIG. 1 with reference to injection controller 44.

As discussed with reference to FIG. 4, initially, the first switch 306 is closed and thus current flows from the voltage source 302 through the coil 116, through the MOSFET 306, and to ground. The micro-controller 314 will then turn the MOSFET 306 off thereby opening the gate and facilitating the storage of energy within the coil 116. In this particular embodiment, the second switch is illustrated as a diode 308. In this configuration, the current will initially flow through the diode 308 once the coil 116 builds a charge of over 0.7 volts. One advantage of using a diode 308 as a second switch is that the current will automatically flow through the diode 308 once the coil 116 reaches a certain threshold voltage above the voltage of the capacitor 316. Here, the voltage in the coil 116 only needs to be 0.7 volts above the voltage in the capacitor 316 to activate the switch. By having an automatic activation, switch 308 does not need to be coupled to a micro-controller. This may reduce the cost of the circuit and the complexity of the design. However, it should be evident that any configuration may be used such that the switch closes when the voltage in the coil 116 reaches some greater threshold above the voltage in the capacitor 316.

Energy is stored in the capacitor 316 until such time that micro-controller 318 closes the third switch 310. At this point, the voltage stored in the capacitor 316 will be driven back to the coil 116 thereby facilitating the reciprocating motion of the drive member 122 (shown in FIGS. 2 and 3) at an increased speed. Here, the third switch 310 is constructed using diodes 320 and 322, resistors 324, 326 and 328, and transistor 330. However, it should be evident again that any preferred switching circuit may be used for the switch 310.

Next, before the drive assembly reaches its initial position, the third switch 310 is opened, the first switch 306 is closed and a voltage is applied by the voltage source 302. This slows down the drive assembly before it reaches its initial position. Then, the first switch 306 is opened and the current will flow through diode 308 such that the voltage stored in the coil 116 will be transferred to the capacitor 316 in the manner previously described.

Figure 6:
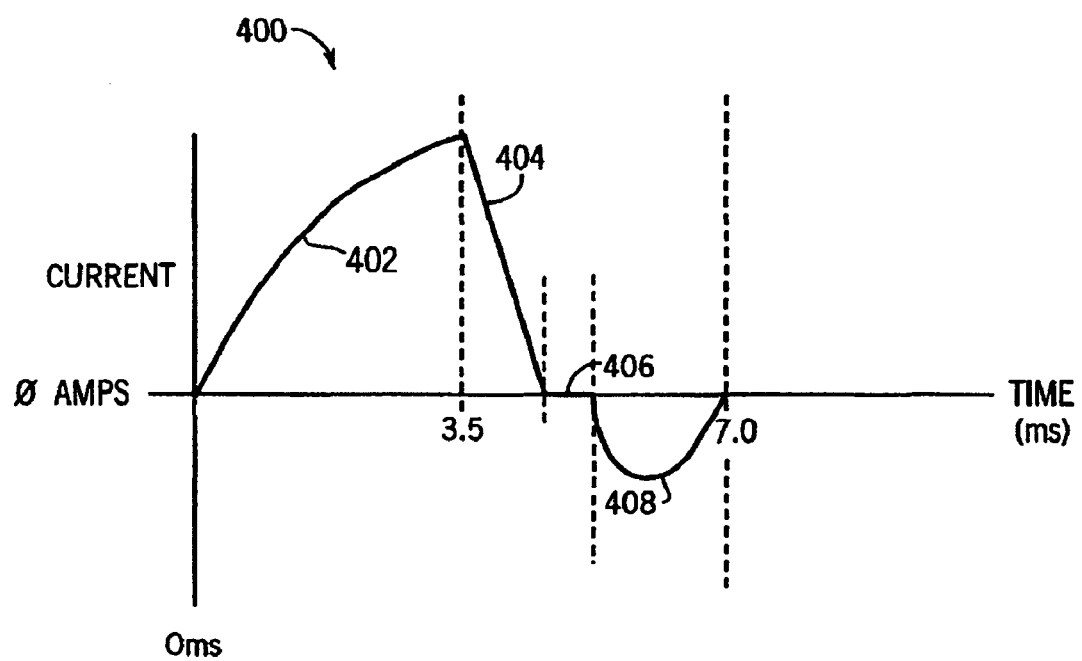
FIG. 6 is a current waveform corresponding to the reciprocating circuit illustrated in FIGS. 4 and 5.

FIG. 6 illustrates a current waveform in accordance with the embodiment illustrated in FIGS. 4 and 5. The typical cycle time for an injection cycle is greater than 10 ms. The present embodiment however, enables an injection time of 1-7 ms as further discussed below. A waveform 400 is illustrated over time in FIG. 6. The first segment 402 of the waveform 400 illustrates the fuel injection event corresponding to current path 214 in FIG. 4. The cycle time for the fuel injection event according to the present embodiment is generally less than 3.5 ms. The second segment 404 of the curve 400 illustrates the capacitor charging as the energy from the fuel injector coil is dissipated into the capacitor, as indicated by current path 216 in FIG. 4. There may be some amount of time 406 along the curve between the time that the capacitor is charging 404 and when the capacitor is discharging through the fuel injector in a reverse direction as illustrated by curve segment 408. The time it takes for the capacitor to charge from the power dissipation from the coil and for the capacitor to discharge back to the coil to enable the reciprocal motion of the drive member may vary depending on the engine capabilities and the speed of the motor. In the present embodiment, however, the cycle time may be less than 3.5 ms.

Figure 7:
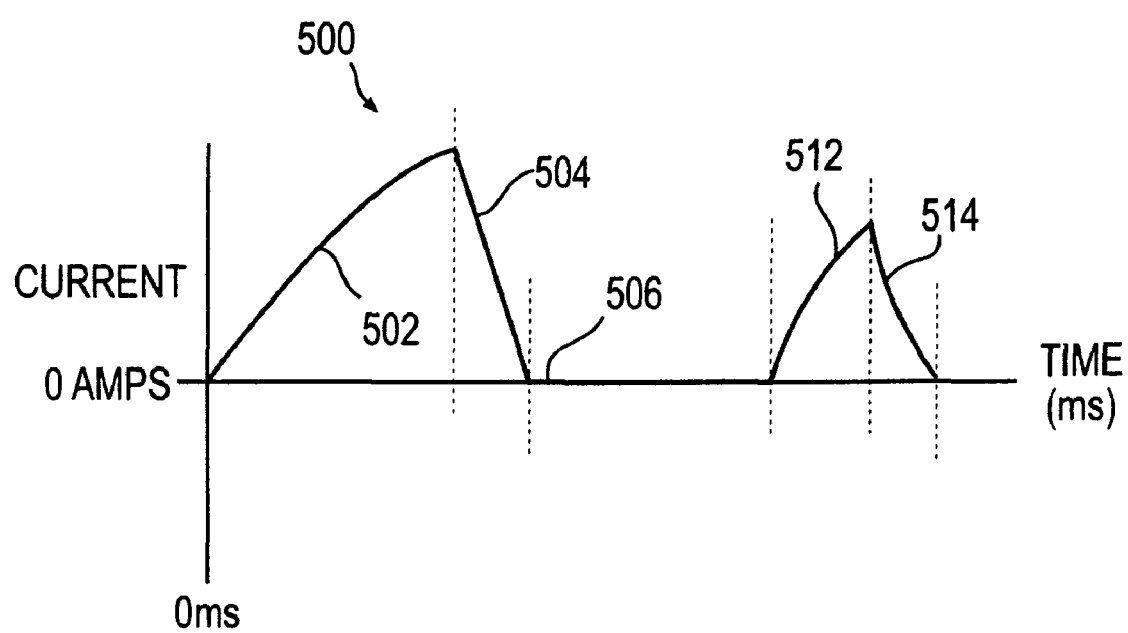
FIG. 7 is another current waveform corresponding to the reciprocating circuit illustrated in FIGS. 4 and 5.

FIG. 7 illustrates another current waveform 500 in accordance with the embodiment illustrated in FIGS. 4 and 5. The waveform 500 is particularly well suited for use in relatively longer cycle times, which in engine applications, for example, would correspond to speeds below 2000 RPM, as will be explained in greater details below. The first segment 502 of the waveform 500 illustrates the fuel injection event corresponding to current path 214 in FIG. 4. The second segment 504 of the waveform 500 illustrates the capacitor charging as the energy from the fuel injector coil is dissipated into the capacitor, as indicated by current path 216 in FIG. 4. Due to the relatively long cycle time where waveform 500 would be used, there is no need to discharge the capacitor to force the drive member 122 in a reverse direction. The biasing force of spring 130 alone is sufficient to return the drive member 122 in time for the following injection cycle. The third segment 506 corresponds to a portion of the time taken for returning the drive member 122 to its initial position by using the spring 130. The fourth segment 512 of the waveform 500 illustrates current being applied through current path 214 in the instant just prior to the drive member 122 reaching its initial position. This has the effect of slowing down the drive member 122, coil 116, and coil bobbin 114. The signals corresponding to third segment 506 and fourth segment 512 are preferably configured so as to bring the velocity of the drive member 122, coil 116, and coil bobbin 114 as close to zero as possible before the coil bobbin 114 impacts the housing 106. The fifth segment 514 of the waveform 500 illustrates the capacitor charging once again as the energy from the fuel injector coil is dissipated into the capacitor, as indicated by current path 216 in FIG. 4.

As indicated above, waveform 500 is particularly well suited for use in relatively longer cycle times when the noise generated by the device in which the injector is being used tends to be lower. In engine applications, this corresponds to engine speeds of less then 2000 RPM. Under these conditions in prior applications, the noise generated by the coil bobbin 114 impacting the housing 106 may be heard as a "clicking" noise. By applying the signal corresponding to fourth segment 512, the velocity of the of the coil bobbin 114 is reduced prior to its impact with the housing 106, thus reducing the "clicking" noise. Preferably, the "clicking" noise would be reduced to a level below the noise level of the operating environment so as to no longer be heard. Also, by not applying a reversing current for returning the drive member 122 to its initial position, minimal heat is generated by the coil 116 when waveform 500 is used. Even though waveform 500 provides more advantages at low engine speeds, it may nonetheless be possible to use it at other speeds.

Figure 8:
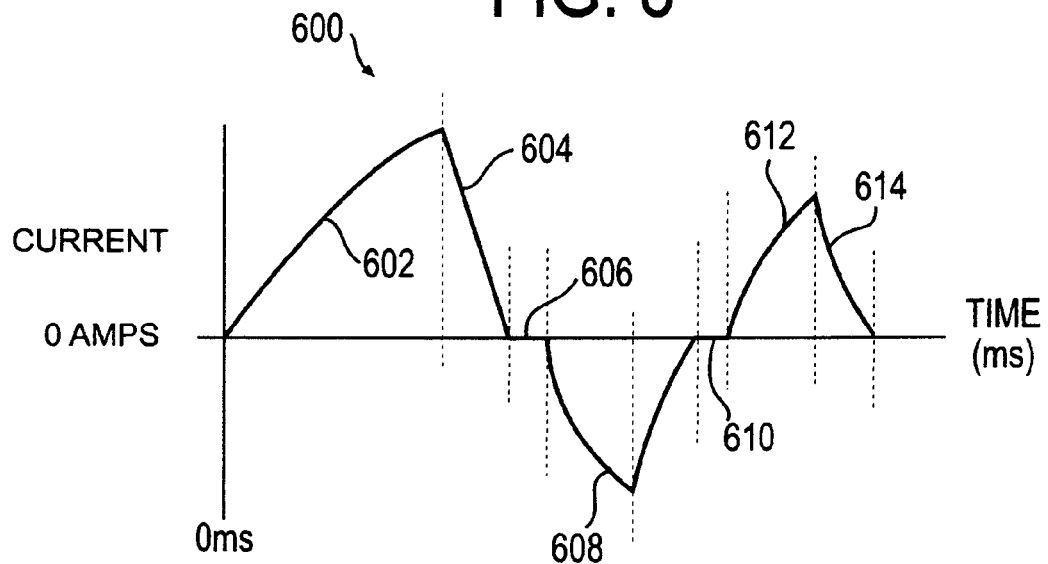
FIG. 8 is yet another current waveform corresponding to the reciprocating circuit illustrated in FIGS. 4 and 5.

FIG. 8 illustrates another current waveform 600 in accordance with the embodiment illustrated in FIGS. 4 and 5. The waveform 600 is particularly well suited for use in short cycle times as will be explained in greater details below. The first segment 602 of the waveform 600 illustrates the fuel injection event corresponding to current path 214 in FIG. 4. The second segment 604 of the waveform 600 illustrates the capacitor charging as the energy from the fuel injector coil is dissipated into the capacitor, as indicated by current path 216 in FIG. 4. There may be some amount of time, illustrated by third segment 606, along the curve between the time that the capacitor is charging 604 and when the capacitor is discharging through the fuel injector in a reverse direction as illustrated by fourth curve segment 608. Then, there may be some amount of time, illustrated by fifth segment 610, along the curve between the time that the capacitor is discharging 608 and the time when the signal illustrated by sixth segment 612 is applied. The sixth segment 612 of the waveform 600 illustrates current being applied through current path 214 in the instants just prior to the drive member 122 reaching its initial position. This has the effect of slowing down the drive member 122, coil 116, and coil bobbin 114. The signals corresponding to fifth segment 610 and sixth segment 612 are preferably configured so as to bring the velocity of the drive member 122, coil 116, and coil bobbin 114 as close to zero as possible before the coil bobbin 114 impacts the housing 106. The seventh segment 614 of the waveform 600 illustrates the capacitor charging once again as the energy from the fuel injector coil is dissipated into the capacitor, as indicated by current path 216 in FIG. 4.

As indicated above, waveform 600 is particularly well suited for use in relatively short cycle times when the coil bobbin 114 would, in prior applications, impact the housing 106 at very high velocities. Under these conditions in prior applications, the force of the impact would cause the coil bobbin to bounce around. This may result in the armature not being in the correct initial position upon the initiation of the following injection event, thus reducing the precision of the injector. By applying the signal corresponding to sixth segment 612, the velocity of the of the coil bobbin 114 is minimized prior to the impact with the housing 106, thus reducing the force of the impact and reducing, or even eliminating, the amount of time during which the coil bobbin will be bouncing around. Preferably, the force of impact would be reduced to a level where the coil bobbin would no longer bounce around upon impact. Even though waveform 600 provides more advantages at high engine speeds, it may nonetheless be possible to use it over most, and even all, engine speed ranges, depending on the application. For example, at low engine speeds, sixth segment 612 of waveform 600 would provide the same advantage as fourth segment 512 of waveform 500.

It is contemplated that more than one waveform 400, 500, and 600 may be used over the total range of speeds of the engine. Since each waveform is best suited for a particular condition of engine operation, by applying different waveforms over different ranges of speed, it is possible to obtain improved operation over the full range of speeds.

For example, waveform 500 would be used at low speeds, then as the speed of the engine is increased, over 2000 RPM for example, waveform 400 might be used up to engine speeds that would cause the coil bobbin to bounce around. Beyond that speed, waveform 600 would be used. In other situations, it would also be possible to use only waveform 400 at low speeds and waveform 600 at all other speeds.

Finally, in other situations, it is also contemplated to use waveform 600 over the complete range of speeds of the engine.

Whether only a single waveform, or multiple waveforms are to be used, and which combination of waveforms to use, would be determined by the operating characteristics of the engine and the operating conditions thereof.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of displacing a pumping assembly comprising the steps of:
   (a) energizing a coil assembly by applying a first current in a first direction through the coil assembly to displace a drive assembly from an initial position towards an actuated position, to cause, at least in part, a first pumping motion;
   (b) returning the drive assembly to the initial position by applying a second current in a second direction through the coil assembly to cause, at least in part, a second pumping motion;
   (c) while returning the drive assembly to the initial position, energizing the coil assembly by applying a third current in the first direction through the coil assembly to decelerate the drive assembly before it reaches the initial position;
   (d) providing a first delay between application of the first current and application of the second current; and
   (e) providing a second delay between application of the second current and application of the third current.

2. The method of claim 1, wherein step (b) is further achieved by a biasing spring.

3. The method of claim 1, wherein the second current flows from a capacitor.

4. The method of claim 3, wherein the capacitor is electrically coupled to the coil assembly and is charged by a discharging of the coil assembly.

5. A fuel injection system for an internal combustion engine, comprising:
   a fuel reservoir;
   at least one reciprocating fuel pump assembly in fluid communication with the fuel reservoir, each of the at least one reciprocating fuel pump assemblies comprising:
      a housing assembly including a drive section and an adjacent pump section;
      a permanent magnet having a first magnetic field disposed in the drive section;
      a coil assembly disposed in the drive section having a winding,
      the coil assembly being capable of reciprocal movement along an axis between an initial position and an actuated position with respect to the permanent magnet, the coil assembly forming, at least in part, a drive assembly;
      a resilient member biasing the coil assembly in the initial position; and
      a pump assembly disposed in the pump section, the pump assembly including a pump member capable of reciprocal movement, the pump member operatively connected to the drive assembly, movement of the drive assembly causing movement of the pump member; and
   a controller for generating a plurality of signals to be selectively applied to the winding, the plurality of signals comprising:
      a first signal having a first polarity for controlling movement of the drive assembly between the initial position and the actuated position;
      a second signal having a second polarity for controlling movement of the drive assembly between the actuated position and the initial position; and
      a third signal having the first polarity for decelerating the drive assembly before the drive assembly returns to the initial position,
   the controller applying the first, second and third signals sequentially,
   the controller providing a first delay between application of the first signal and application of the second signal and a second delay between application of the second signal and application of the third signal.

6. The fuel injection system of claim 5, wherein the second signal flows from a capacitor.

7. A method of controlling a fuel injector for an internal combustion engine comprising the steps of:
   (a) providing an injection controller capable of applying signal waveforms to a drive assembly of the fuel injector to control the movement of the drive assembly,
      the signal waveforms being composed of at least one of a first, a second, and a third energizing signal,
      the first energizing signal for displacing the drive assembly from an initial position for causing a first pumping motion,
      the second energizing signal for returning the drive assembly to the initial position for causing a second pumping motion,
      the third energizing signal for decelerating the pumping assembly before it reaches the initial position;
   (b) applying a first signal waveform comprising the first and third energizing signals to the drive assembly over a first range of engine speeds; and (c) applying a second signal waveform comprising the first and second energizing signals to the drive assembly over a second range of engine speeds greater than the first range.

8. The method of claim 7, wherein the second signal waveform further comprises the third energizing signal.

9. The method of claim 7, further comprising the step of:
(d) applying a third signal waveform comprising the first, second, and third energizing signals to the drive assembly over a third range of engine speeds greater than the second range.

* * * * *